United States Patent [19]

Sorko-Ram

[11] Patent Number: 5,214,539

[45] Date of Patent: May 25, 1993

[54] CONCAVE MIRROR WITH CONVEX ACRYLIC COVER

[76] Inventor: Paul Sorko-Ram, 1111 N. Centerville Rd., Sturgis, Mich. 49091

[21] Appl. No.: 920,247

[22] Filed: Jul. 27, 1992

[51] Int. Cl.⁵ .............................................. G02B 5/08
[52] U.S. Cl. ..................................... 359/839; 40/219; 40/582; 40/900
[58] Field of Search .................. 359/838, 839; 40/219, 40/561, 582, 900

[56] References Cited

U.S. PATENT DOCUMENTS

| | | | |
|---|---|---|---|
| 809,698 | 1/1906 | Kelley | 359/839 |
| 2,114,711 | 4/1938 | Horinstein | 40/900 |
| 2,203,245 | 6/1940 | White | 40/219 |
| 2,286,246 | 6/1942 | Yearta | 40/219 |
| 4,776,118 | 10/1988 | Mizuno | 40/219 |

Primary Examiner—Bruce Y. Arnold
Assistant Examiner—J. R. Ryan
Attorney, Agent, or Firm—Krass & Young

[57] ABSTRACT

The invention is a reflective sign of polymeric material. The base of the sign consists of a spherical mirror. The cover for the sign consists of a transparent spherical section suitable for mating to the spherical mirror. A first opaque visible emblem is applied to the convex side of the cover, and a second emblem is applied to the concave side of the cover, directly behind the first emblem. The second emblem is printed in reverse, so that when it is reflected by the spherical mirror, it appears to the observer in proper orientation. The combined first emblem and second emblem are, therefore, visible to an observer of the device.

8 Claims, 1 Drawing Sheet

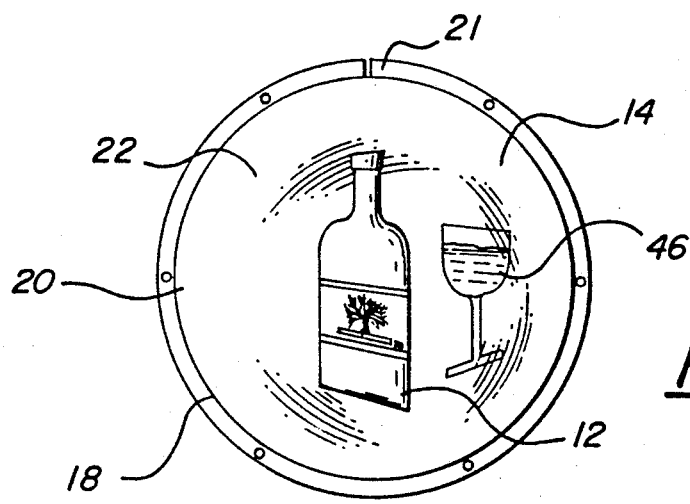
*FIG-1*
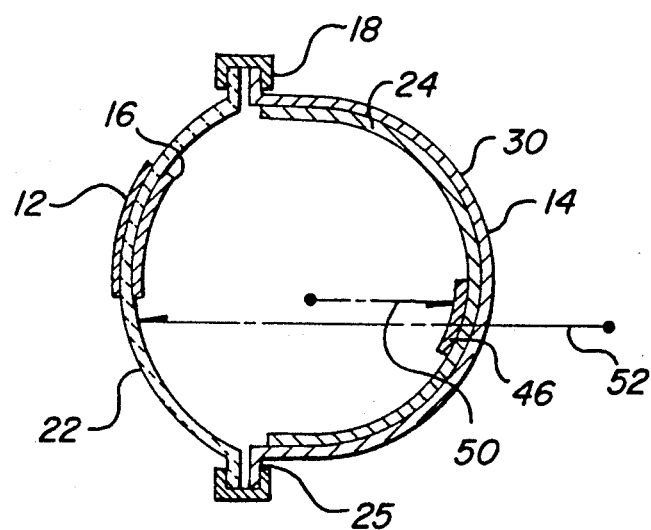
*FIG-2*
*FIG-3*
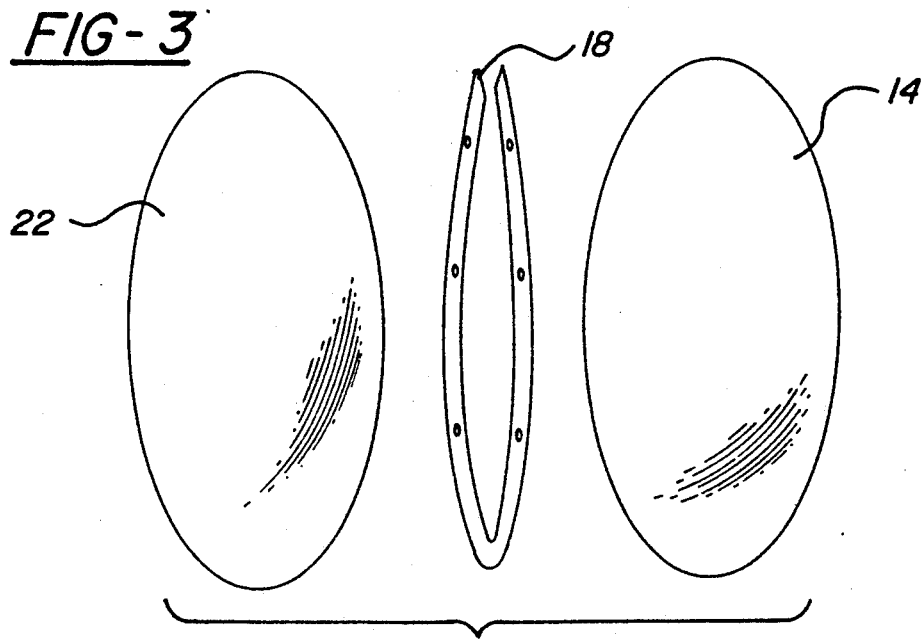

CONCAVE MIRROR WITH CONVEX ACRYLIC COVER

FIELD OF THE INVENTION

The invention pertains to decorative mirrors for advertising purposes.

BACKGROUND OF THE INVENTION

Mirrored surfaces for the presentation of art and advertising messages are well known. See, for example, U.S. Pat. No. 809,698, issued to Kelly, and U.S. Pat. No. 1,849,709 issued to Colberg. Likewise, curved mirrors containing message information are taught in U.S. Pat. No. 1,311,253, as well as in my previously filed application Ser. No. 07/428,637, now abandoned, and my currently pending application Ser. No. 07/638,701. Curved mirrors, in particular, offer optical properties which impart an attractive, often striking appearance to a message applied thereto.

Recently, I began experimentation with and production of an improved mirror display, comprising a concave mirrored acrylic surface, to which I attached a convex clear acrylic surface of matching diameter and sphere. The two pieces, when assembled, formed an enclosure having a lens-like cross section. An opaque emblem, comprising an advertising logo, message, or the like, is applied to the outer convex surface of the clear acrylic surface. A contrasting symbol, optically reversed, is applied to the opposite, concave side of the clear acrylic surface, in approximate registration with the first emblem applied to the outer convex surface, so that the reversed emblem on the convex side of the clear acrylic is obscured from direct view by an observer seeing the convex side of the clear acrylic surface. The reversed image on the concave side of the clear acrylic is reflected by the concave mirrored acrylic surface of the assembly.

In this fashion, the reversed image, when again reversed by the optics of the concave mirror, appears in proper perspective to the observer viewing the entire assembly from the "front", that being the clear acrylic side of the device. The observer then sees both the first emblem, directly, and the second emblem, reflected. The visual effect is quite striking.

While the foregoing article of manufacture was acceptable in many ways, it had a number of limitations. First, the use of identical spherical sections for the concave mirrored portion and the convex clear portion limited the size of a reflected image. It was impossible for the reflected image to be made to appear substantially larger or smaller than the direct image. In addition, the original assembly was difficult to manufacture, in that the manufacturing process for the spherical sections of acrylic lacked sufficient precision to ensure a precise alignment of the edges of the two spherical sections, when assembled. This misalignment dictated the use of large amounts of adhesive, and a rather unsightly clamping ring around the entire perimeter of the completed assembly.

The present invention eliminates the foregoing problems, and produces a greatly improved visual effect.

BRIEF DESCRIPTION OF THE DRAWINGS

FIG. 1 is a perspective view of the invention, showing the visual effect obtained from the direct and reverse images.

FIG. 2 is a cross section of the assembly, showing the position of the emblems in relation to the clear acrylic and mirrored acrylic surfaces.

FIG. 3 is an exploded view, showing the main components of the invention prior to assembly.

DESCRIPTION OF THE PREFERRED EMBODIMENT

My invention can best be understood, first, by reference to FIGURE a perspective view of the display mirror assembly.

Emblem 12, in the form of an advertising message, logo, rendering, or combination thereof, is applied by conventional means, such as painting, decal or the like to the outer surface of a convex cover 22. Emblem 12 is opaque. Invisible in FIG. 1, but shown in cross section in FIGURE 2, is a second emblem 16, which is applied to the reverse side of convex cover 22, directly behind emblem 12, in such a fashion as to ensure that emblem 12 completely masks emblem 16 from a direct view. Emblem 16 is applied to the reverse side of convex cover 22 in a manner similar to that used for the application of emblem 12, i.e., painting, decal or the like. Emblem 16 is created as a "reverse" image, which will appear in proper orientation and perspective when viewed in a reflective surface, such as a mirror. Emblem 16 is reflected onto the surface of concave mirror 14. By selection of the radius 50 of concave mirror 14, the reflected image 46 of emblem 16 is may be magnified or reduced, appearing larger or smaller than the actual size of the emblem 16. The degree of magnification is a function of the radius of the sphere of which convex acrylic cover 22 is a section, and the radius of the sphere of which the concave mirror 14 is a section. This relationship is defined by the formula:

$$\frac{1}{f_1} + \frac{1}{f_2} = \frac{1}{F} = \frac{2}{R}$$

where R is the radius of curvature of concave mirror 14, F is the principal focus, and $f_1$ and $f_2$ are any two conjugate focal distances. More particularly, where the linear dimension of emblem 16 is $O_d$, the apparent dimension of the image 46, mathematically represented as $I_d$, is defined by the formula:

$$\frac{O_d}{I_d} = \frac{u}{v}$$

where u represents the distance of the emblem 16 from the surface of the concave mirror 14, and v represents the distance of the image from the mirror.

For a reduced image size, radius 52 is selected so as to insure that it is greater than radius 50. For magnification, radius 52 is selected so as to insure that it is smaller than radius 50. It is my experience that optimal results are achieved when the ratio of the two radii is in the range of 1.2:1.

Also shown in FIG. 2 are the flanges 25 formed on the outer circumference of cover 22 and mirror 14. Preferably, these flanges are between one half and one inch in length, and facilitate assembly of the cover 22 and mirror 14. The flanges are formed at such angle to a tangent line of said cover 22 and said mirror 14, so that the flanges of said cover 22 and mirror 14 are parallel when said cover and said mirror are aligned.

As further shown in FIG. 1 and FIG. 2, the two halves of the assembly are held in juxtaposition by a split clamping band 18, the ends of which meet at junction 21. Preferably, the clamping band, the cover 22 and mirror 14 are pressed together in a suitable press, forming clamping band 18 in position around the circumference of convex cover 22 and concave mirror 14. Mounting openings 20 are disposed around the circumference of band 18 to provide locations for fasteners or suspension lines, for positioning the assembly in the desired location, such as a store, restaurant, bar, or the like.

As above described, convex cover 22 is preferably clear or tinted transparent polymer material, such as acrylic. Other suitable materials may be selected from the field of transparent polymers, including polycarbonates and polyester terithylene acid-glycol (PETG) and are preferably of either clear or tinted transparent material. The concave mirror 14 is comprised of a polymeric base 32, to which a mirror coating 30 has been applied, using well known techniques, e.g., vapor deposition of metallic films. The surface 24 of the mirror coating 30 appears highly polished, and acts to reflect light entering the assembly from the front, while at the same time, reflecting the image 46 of emblem 16. Mirror coating 30 is preferably silver, but may be any of a broad spectrum of colored reflective coatings.

In this fashion, the observer of the assembly will perceive not only the emblem 12, but also the reflected image 46 of emblem 16. The concavity of the mirror causes the reflected image 46 to appear to "float" from top to bottom and left to right on the mirrored surface, depending on the position of the viewer in relation to the assembly. The overall effect is striking, and the viewer is accordingly attracted to the messages contained in emblems 12 and 16.

In FIG. 3, the three major subassemblies of the completed assembly are depicted. The convex polymeric cover 22 is manufactured as a section of a sphere having a radius as set forth in detail above. A second polymeric surface, consisting of a concave mirror 14, is separately manufactured, and assembled together with cover 22 using an metal band 18. Metal band 18 is positioned around the cover 22 and mirror 14 when the two are in juxtaposition, and the edges of the band capture the flanges 25 of the cover and mirror, holding the two components securely together.

Having thus described my invention, the various and apparent objects may be easily achieved, and additional variations may be made to the invention without departing from the spirit and content of the invention which I claim as follows:

1. A reflective sign comprising:
   a concave mirror;
   a convex, substantially transparent polymeric cover for said mirror, having a diameter substantially equal to the diameter of said mirror, and having an outer surface and an inner surface, and having a radius of curvature which is greater than the radius of curvature of said mirror;
   a first opaque emblem applied to the concave surface of said cover;
   a second opaque emblem applied to said inner surface of said cover, and positioned substantially opposite said first emblem; and
   means for securing the outer circumference of said mirror to the outer circumference of said cover.

2. The invention of claim 1 wherein said concave mirror comprises a section of a sphere, and wherein said cover comprises a section of a sphere having a radius which is approximately 1.2 times the radius of said spherical section comprising said mirror.

3. The invention of claim 1 wherein said concave mirror comprises a section of a sphere, and wherein said cover comprises a section of a sphere having a radius which is approximately 0.8 times the radius of said spherical section comprising said mirror.

4. The invention of claim 1, wherein said mirror and said cover further comprise flanges at the outer circumferences thereof, said flanges extending outward from said circumferences.

5. The invention of claim 1, wherein said second opaque emblem is smaller in dimension then said first opaque emblem, and is obscured from view by said first emblem, when said cover is viewed from the side of said first emblem.

6. A reflective sign comprising:
   a concave mirror;
   a convex, substantially transparent polymeric cover for said mirror, having a diameter substantially equal to the diameter of said mirror, and having a radius of curvature which is lesser than the radius of curvature of said mirror;
   a first opaque emblem applied to the convex surface of said cover;
   a second opaque emblem applied to the concave surface of said cover, and positioned substantially opposite said first emblem; and
   means for securing the outer circumference of said mirror to the outer circumference of said cover.

7. The invention of claim 6, wherein said mirror and said cover further comprise flanges at the outer circumference thereof, said flange extending outward from said circumferences.

8. The invention of claim 6, wherein said second opaque emblem is smaller in dimension then said first opaque emblem, and is obscured from view by said first emblem, when said cover is viewed from the side of said first emblem.

* * * * *